US011362495B1

(12) United States Patent
Angel et al.

(10) Patent No.: US 11,362,495 B1
(45) Date of Patent: Jun. 14, 2022

(54) CRADLE FOR INDUSTRIAL POWER CABLES

(71) Applicants: Arturo Angel, San Gabriel, CA (US); Agustin Varela, El Monte, CA (US)

(72) Inventors: Arturo Angel, San Gabriel, CA (US); Agustin Varela, El Monte, CA (US)

( * ) Notice: Subject to any disclaimer, the term of this patent is extended or adjusted under 35 U.S.C. 154(b) by 0 days.

(21) Appl. No.: 17/128,433

(22) Filed: Dec. 21, 2020

Related U.S. Application Data

(60) Provisional application No. 63/126,240, filed on Dec. 16, 2020.

(51) Int. Cl.
*H02G 3/04* (2006.01)
*H02G 3/30* (2006.01)
*H02G 3/22* (2006.01)

(52) U.S. Cl.
CPC .............. *H02G 3/0456* (2013.01); *H02G 3/22* (2013.01); *H02G 3/30* (2013.01)

(58) Field of Classification Search
CPC ........ H02G 3/0456; H02G 3/30; H02G 3/305; H02G 3/34; H02G 3/22; H02G 3/263; H02G 3/261
USPC ............ 248/65, 300, 302, 231.91, 247, 248, 248/218.2
See application file for complete search history.

(56) References Cited

U.S. PATENT DOCUMENTS

| | | | | |
|---|---|---|---|---|
| 1,431,662 A | * | 10/1922 | Horning | B60T 17/046 248/300 |
| 1,548,406 A | * | 8/1925 | Boes | F23Q 7/00 219/201 |
| 2,208,358 A | * | 7/1940 | Chandler | E04H 12/32 248/540 |
| 2,896,009 A | * | 7/1959 | Caveney | H02G 3/045 174/72 A |
| 2,905,201 A | * | 9/1959 | Mcnaughton | H02G 3/0608 285/419 |
| 2,911,175 A | * | 11/1959 | Erie | A47K 10/185 248/217.2 |
| 3,168,275 A | * | 2/1965 | Grondin | A47K 10/185 248/205.3 |
| 4,907,766 A | * | 3/1990 | Rinderer | F16L 3/243 248/57 |
| 5,305,381 A | * | 4/1994 | Wang | B60R 11/0241 379/426 |
| 5,404,599 A | * | 4/1995 | Warkus | E04C 2/521 4/670 |

(Continued)

*Primary Examiner* — Nkeisha Smith
(74) *Attorney, Agent, or Firm* — Brennan, Manna & Diamond, LLC

(57) ABSTRACT

A cable cradle device for retaining and protecting industrial power connectors that are used to charge industrial equipment. The cable cradle device is configured to retain the special power charging cable and plugs which fits the dimensions of the charger plugs. The cable cradle device comprises a rectangular base wall configured for mounting the cable cradle device a wall or a pole. The cable cradle device further comprises two opposite brackets extending laterally from the base wall, a bottom bracket extending outwards from a bottom edge of the rectangular base wall having two symmetric cut outs. The cable cradle device forms a housing to hold a power plug which rests on the bottom bracket and is supported by the opposite brackets with the cables passing through the cut outs. A method of forming the cable cradle device is also disclosed.

10 Claims, 4 Drawing Sheets

(56) References Cited

U.S. PATENT DOCUMENTS

| | | | | |
|---|---|---|---|---|
| 5,555,302 A * | 9/1996 | Wang | B60R 11/0241 | |
| | | | 379/426 | |
| D376,530 S * | 12/1996 | Hawthorne | D8/358 | |
| 5,593,115 A * | 1/1997 | Lewis | F16L 3/227 | |
| | | | 248/68.1 | |
| 5,694,468 A * | 12/1997 | Hsu | B60R 11/0241 | |
| | | | 379/426 | |
| 6,098,939 A * | 8/2000 | He | H02G 1/00 | |
| | | | 174/58 | |
| 6,140,584 A * | 10/2000 | Baldissara | H02G 3/045 | |
| | | | 174/68.3 | |
| 6,765,146 B1 * | 7/2004 | Gerardo | H02G 1/00 | |
| | | | 174/50 | |
| 6,951,324 B2 * | 10/2005 | Karamanos | F24D 19/02 | |
| | | | 248/300 | |
| 7,004,435 B2 * | 2/2006 | Formon | A47K 10/185 | |
| | | | 206/233 | |
| 7,053,300 B2 * | 5/2006 | Denier | H02G 3/18 | |
| | | | 174/50 | |
| 7,271,335 B2 * | 9/2007 | Dinh | H02G 3/125 | |
| | | | 174/50 | |
| 7,459,633 B2 * | 12/2008 | Burns | H02G 3/0418 | |
| | | | 138/168 | |
| 7,946,540 B2 * | 5/2011 | Drane | H02G 3/263 | |
| | | | 248/65 | |
| 8,378,213 B1 * | 2/2013 | Gerardo | H02G 3/126 | |
| | | | 174/58 | |
| 8,490,937 B2 * | 7/2013 | Crain | F16M 11/041 | |
| | | | 248/316.6 | |
| 8,690,008 B2 * | 4/2014 | Conway | A47K 10/421 | |
| | | | 221/46 | |
| 8,979,043 B2 * | 3/2015 | Florman | F21V 21/00 | |
| | | | 248/200 | |
| 9,534,709 B2 * | 1/2017 | Wilson | F16L 3/227 | |
| 9,810,369 B2 * | 11/2017 | Lilieholm | H01Q 1/1207 | |
| 2003/0059562 A1 * | 3/2003 | Lien | B60R 16/0215 | |
| | | | 428/36.9 | |
| 2003/0222185 A1 * | 12/2003 | Rubenstein | H02G 3/30 | |
| | | | 248/68.1 | |
| 2005/0067546 A1 * | 3/2005 | Dinh | H02G 3/125 | |
| | | | 248/343 | |
| 2006/0102820 A1 * | 5/2006 | Boville | F16B 7/22 | |
| | | | 248/300 | |
| 2006/0157626 A1 * | 7/2006 | Wooten | A47B 96/061 | |
| | | | 248/248 | |
| 2007/0009220 A1 * | 1/2007 | Jadaud | H02G 3/32 | |
| | | | 385/135 | |
| 2009/0173844 A1 * | 7/2009 | Huo | H02G 3/32 | |
| | | | 248/65 | |
| 2013/0240698 A1 * | 9/2013 | Diwan | A47B 81/005 | |
| | | | 248/231.91 | |
| 2015/0121781 A1 * | 5/2015 | Nugent | E06B 9/02 | |
| | | | 52/202 | |

* cited by examiner

CRADLE FOR INDUSTRIAL POWER CABLES

CROSS-REFERENCE TO RELATED APPLICATION

The present application claims priority to, and the benefit of, U.S. Provisional Application No. 63/126,240, which was filed on Dec. 16, 2020 and is incorporated herein by reference in its entirety.

FIELD OF THE INVENTION

The present invention relates generally to the field of accessories for industrial cable connectors. More specifically, the present invention relates to a cradle device for holding and protecting industrial power connectors that are used for charging industrial equipment. The cable cradle device can easily be mounted on a wall or a pole at a height above the ground, thereby preventing cables and plugs to be on the ground and from being damaged. Accordingly, this disclosure makes specific reference thereto the present invention. Nonetheless, it is to be appreciated that aspects of the present invention are also equally applicable to other like applications, devices and methods of manufacture.

BACKGROUND

By way of background, a variety of cables are used in the industry for networking, power transmission, communication and other purposes. Coaxial, data, and instrumentation cables are some of the most common cables used in the industries. Cable connectors are electro-mechanical devices which are utilized for joining electrical terminals and/or creating electrical circuits. These electrical cable connectors may comprise of plugs (male-ended) and jacks (female-ended). The connection through the electrical connector may be temporary, as for portable equipment, require a tool for assembly and removal, or serve as a permanent electrical joint between two wires or devices. Examples of the cable connectors are twisted-pair connectors, coaxial cable connectors, fiber-optic connectors, etc.

Cable cradle connectors are often left on the ground during installation and are not organized in a proper manner. Typically, the cable connectors are structured to connect the power cables. There is no means for mounting the cable connectors with joined cables. Due to lack of proper mounting, the electrical connectors may be damaged by sliding, being stepped on, or other mechanical friction events. This can be problematic as it can have a negative influence on the service life and on the operating reliability of the electrical connection. Further, it is also not safe to work around damaged electrical connectors as the people are in danger of electric shock due to damaged connectors and potential short circuits in the connected wires. Industrial charger connectors and cables are normally made of plastic. Without protection they are easily damaged leading to unwanted expense to replace them.

Therefore, there exists a long felt need in the art for a device that can retain industrial power cable connectors. There is also a long felt need in the art for a means for protecting power cable connectors from being damaged, and thereby prevent expensive replacement of the connector devices. There is also a long felt need in the art for a mounting device for protecting power cable connectors that prevents any loss to the user due to damage in connection of electrical wires. There is also a long felt need in the art for a cradle or holder for industrial power cables which increases the life of the cables. Additionally, there is a long felt need in the art for a cradle for cable connector devices that enables a user to easily mount the cable connector connecting cables on a wall or a pillar. Moreover, there is a long felt need in the art for a cradle for industrial power cable connectors that maintains safety of users and prevents any injuries to the user.

In this manner, the present invention accomplishes all of the forgoing objectives, and provides a relatively safe, convenient and cost-effective solution to mounting cables on a wall, pole, pillar or the like. The cradle or holder for industrial power cables of the present invention is also user friendly, inasmuch as the user can easily fit the cable connector device into the cradle and further mount the cradle on a wall or the like, thereby protecting the cables from being damaged, increasing the life of cables and providing safety of users. The invention offers a novel and effective solution for mounting the power cable connectors connecting cables for industrial equipment, and thereby preventing the cables from being damaged.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cable cradle device for protecting and mounting an industrial power connector. The cable cradle device comprises a square or rectangular base wall having one or more inserting holes aligned with the holes of the industrial power connector for mounting the holder to a wall or a pole. The cable cradle device further comprises a pair of opposite side brackets each extending from a longitudinal side edge of the base wall. Each opposite side wall is bent in a substantially U-shape comprising a bracket side wall and a bracket rim wall. The cable cradle device further comprises a bottom bracket. The bottom bracket may comprise a pair of cut-outs configured to fit in cables extending out of a retained power cable connector unit. The base wall, the pair of opposite side brackets, and the bottom bracket form a housing configured to securely receive the industrial power connector from the open top surface of the cable cradle device. The dimensions of the base wall, the opposite brackets and the bottom brackets are constructed for use with different types of connectors. The cable cradle device can be used to protect the industrial power connectors that are used to charge industrial equipment using one or more of conventional, opportunity, and fast charging. The cable cradle device is compatible to a wide range of cable sizes up to approximately 550 amps.

In yet another embodiment, the subject matter comprises cable cradle device for protecting and mounting an industrial power connector. The cable cradle device comprises a rectangular base wall. The cable cradle device further comprises a pair of opposite side brackets each extending from a longitudinal side edge of the base wall. Each opposite side wall is bent in a substantially U-shape comprising a bracket side wall and a bracket rim wall. The cable cradle device further comprises a bottom bracket. The bottom bracket may comprise a pair of cut-outs configured to fit in cables extending out of a retained power cable connector unit. The base wall, the pair of opposite side brackets, and the bottom bracket form a housing configured to securely receive the industrial power connector from the open top surface of the cable cradle device. The cable cradle device further comprises a mounting component. The mounting component is attached to a back of the base wall and attaches the cable cradle device to a mounting surface.

In yet another further embodiment of the present invention, a method of manufacturing a cable cradle device to protect industrial power connectors that are used to charge industrial equipment from physical damage is disclosed. The method comprising the steps of obtaining a metal blank and then cutting a form of the cable cradle device out of the metal blank. The method continues by forming a pair of opposing side brackets laterally extending from the two long edges of a base wall, wherein the brackets are U-shaped across a length of the base wall. Next, a bottom bracket is formed out of a bottom edge of the base wall and a pair of cut-out portions are cut or carved into the bottom bracket. A pair of mounting holes are then drilled into the base wall for mounting the cable cradle device to a surface. Finally, an industrial power connector may be positioned within the cable cradle device with the wires extended out of the industrial power connector positioned over the cut-out portions in the bottom bracket.

The cable cradle device for retaining industrial power connectors is particularly advantageous because the cable cradle device is a practical accessory in many industries that protects the power plugs from being damaged. The cable cradle device can be manufactured to accept most industrial power charging cables. Further, the cable cradle device can be attached to a safe location such as a wall or pole above ground preventing cables and plugs to be on the ground and from being damaged.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
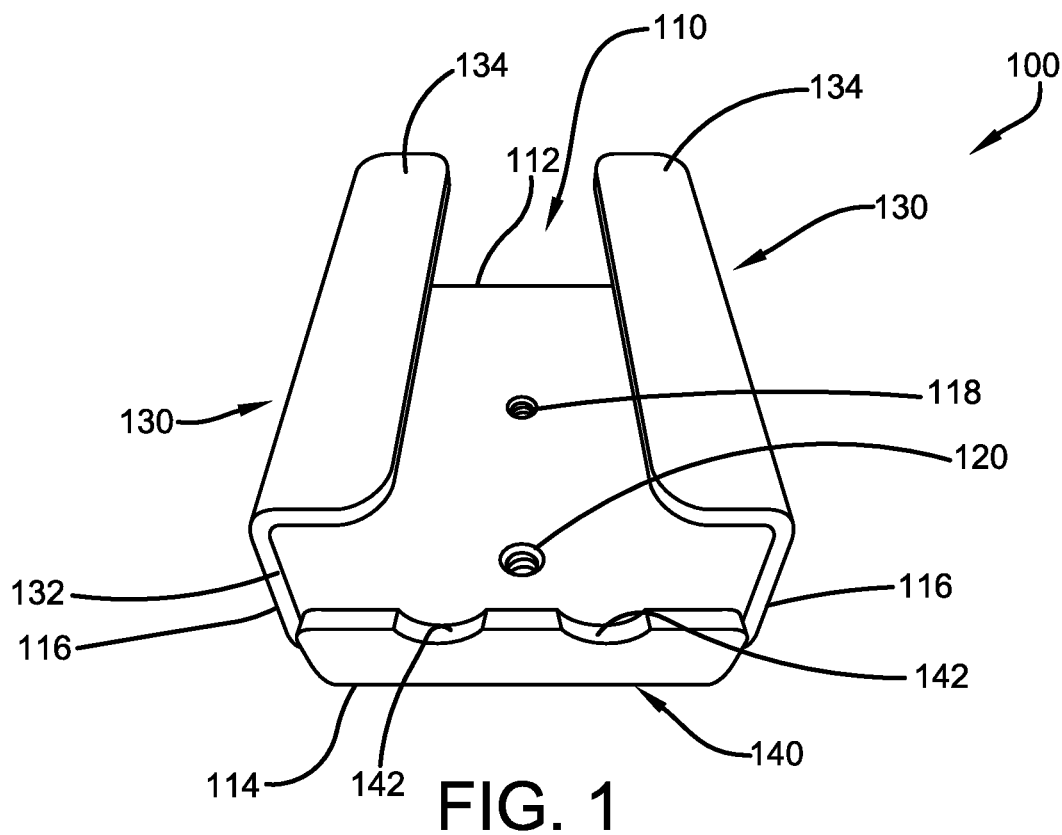
FIG. 1 illustrates a perspective view of one potential embodiment of a cable cradle device of the present invention for retaining a power connector in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a holder for industrial power cable connectors. There is also a long felt need in the art for a means for protecting power cable connectors from being damaged and thereby prevents expensive replacement of the connector devices. There is also a long felt need for a dedicated location for cables that can help avoid arc flashes or short circuits if the connectors are exposed to water or other liquids, or fires if exposed to flammable liquids. There is also a long felt need in the art for a mounting device for protecting power cable connectors that prevents any loss to the user due to damage in connection of electrical wires. There is also a long felt need in the art for a cradle or holder for industrial power cables which increases the life of the cables. Additionally, there is a long felt need in the art for a cradle for cable connector devices that enables a user to easily mount the cable connector connecting cables on a wall or a pillar. Moreover, there is a long felt need in the art for a cradle for industrial power cable connectors that maintains safety of users and prevents any injuries, including trip hazards, to the user. Finally, there is a long felt need in the art for a cradle for industrial power cable connectors that is safe, cost-effective and mountable.

The present invention, in one exemplary embodiment, is a connector holder unit comprising a base portion having one or more holes for mounting a power cable connector unit, a pair of opposite side walls forming holding structure to hold the power cable connector unit over the base portion, a bottom wall with a pair of cut-out to fit in cables extending out of the power cable connector unit. The invention offers a novel and effective solution for mounting the power cable connectors connecting cables for industrial equipment, and thereby preventing the cables from being damaged. The invention is also useable with Power Industrial Trucks (PIT), which is applicable in the industry for equipment or vehicles, where PIT is common to identify battery charging cables.

Figure 2:
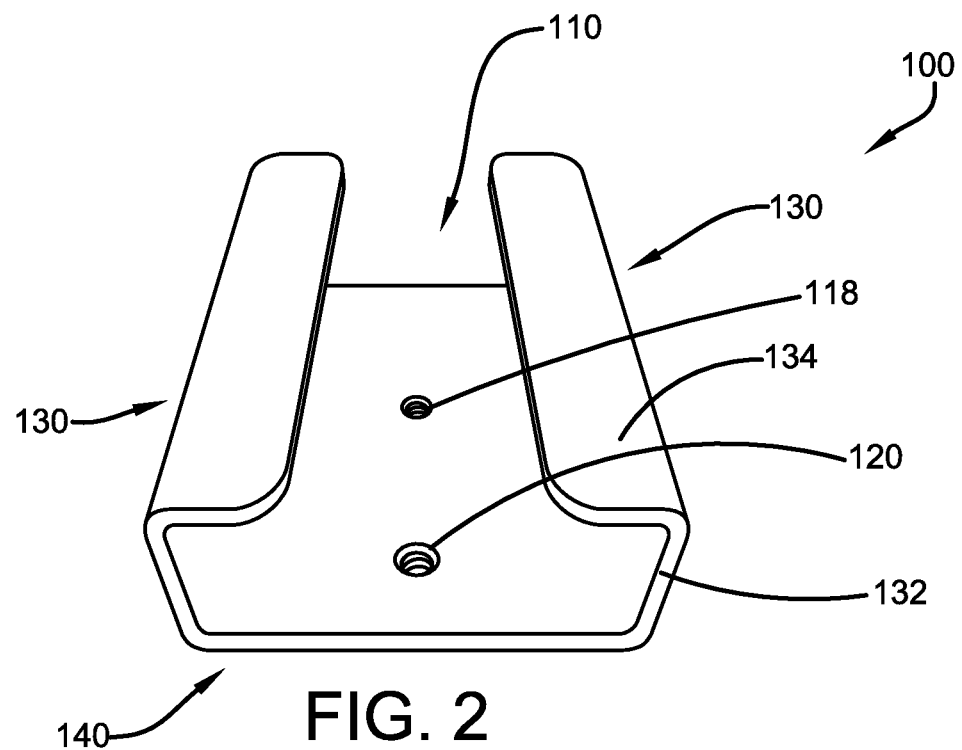
FIG. 2 illustrates a perspective view of the of the cable cradle device of the present invention in accordance with the disclosed architecture.
Figure 3:
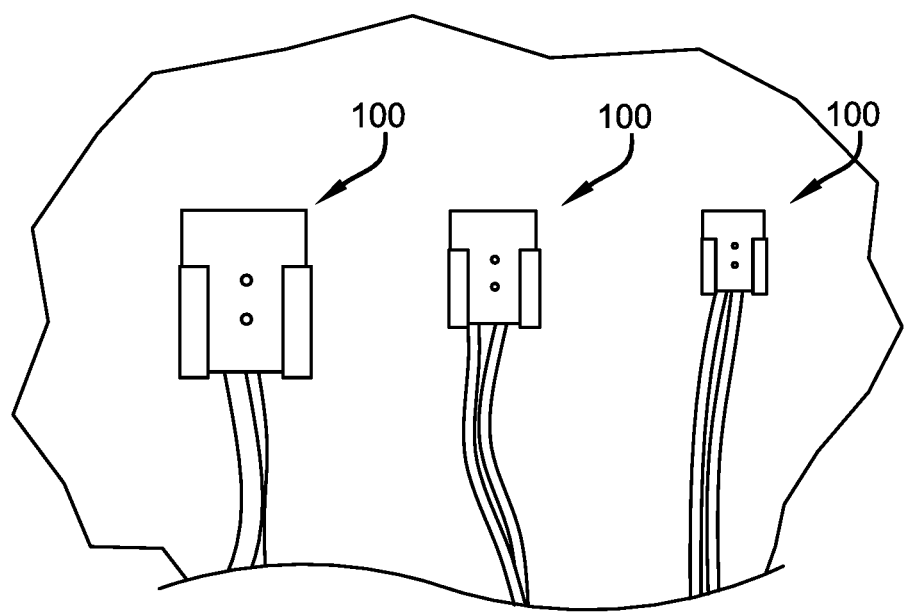
FIG. 3 illustrates a perspective view of a plurality of the cable cradle devices of the present invention in different sizes mounted to a wall and retaining a plurality of power connectors in accordance with the disclosed architecture.

Referring initially to the drawings, FIGS. 1-3 illustrates a cable cradle device 100 for retaining a cable connector, such as industrial power connectors. The cable cradle device 100 is generally rectangular in shape and open at the top to accept a cable connector. The cable cradle device 100 comprises a rectangular base wall 110 which is a planar surface. The base wall 110 comprises a top edge 112, a bottom edge 114, and a pair of side edges 116. The base wall 110 further comprises a pair of mounting holes 118 and 120. The pair of mounting holes 118 and 120 are positioned at a radial midpoint of the base wall 110, wherein the upper hole 118 and the lower hole 120 are drilled vertically in the longitudinal direction. The pair of mounting holes 118 and 120 may be countersunk into the base wall 110 so that a fastener inserted therein will not intrude into the cable connector retaining space of the cable cradle device 100.

The cable cradle device 100 further comprises a pair of opposing side brackets 130. Each opposing side brackets 130 comprises a bracket side wall 132 that extends generally perpendicularly upward from the respective longitudinal side edges 116 of the base wall 110. Each opposing side brackets 130 further comprises a bracket rim wall 134. Each bracket rim wall 134 extends inwardly from a top of the respective bracket side wall 132 toward the opposing side bracket 130. Each bracket rim wall 134 is substantially parallel to the base wall 110. As such, each side bracket 130 is L-shaped and form a U-shaped housing with the base wall 110 where the industrial power connector can be inserted from the top of the cable cradle device 100.

The cable cradle device 100 further comprises a bottom bracket 140. The bottom bracket 140 is a flat lip that extends perpendicularly outward from the bottom edge 114 of the base wall 110. The bottom wall 106 may be flat or comprise a pair of cut-outs 142 of generally semi-circular shape that are symmetric to the radial midpoint of the bottom edge 114.

The cable cradle device 100 functions like a boot holder and looks like a formed box to hold the special power charging cable and plugs which fits the dimensions of the charger plugs. In one embodiment of the invention, volume of the cable cradle device 100 could vary from 16 to 40 cubic inches (0.26-0.65 Liters). In other embodiment, the volume of the holder 100 could vary from 24 to 50 cubic inches (0.39-0.81 Liters). The cable cradle device 100 may be injection molded or be manufactured from a bendable sheet metal that can be painted or anodized to identify color coding as per industrial power level requirements or to prevent oxidation of the metal.

The dimensions of the cable cradle device 100 can vary as per the different sizes of the industrial power connectors used along with the different sizes of the cables. The cable cradle device 100 can have the capability of holding connectors of any size. The cable cradle device 100 is generally manufactured as a single unit product with no joints or connections, thus making it easy for installation and maintenance. The cable cradle device 100 can be mounted to a wall, pole or a ceiling using fasteners such as screws in the pair of mounting holes 118 and 120 as illustrated in FIG. 3.

Figure 4:
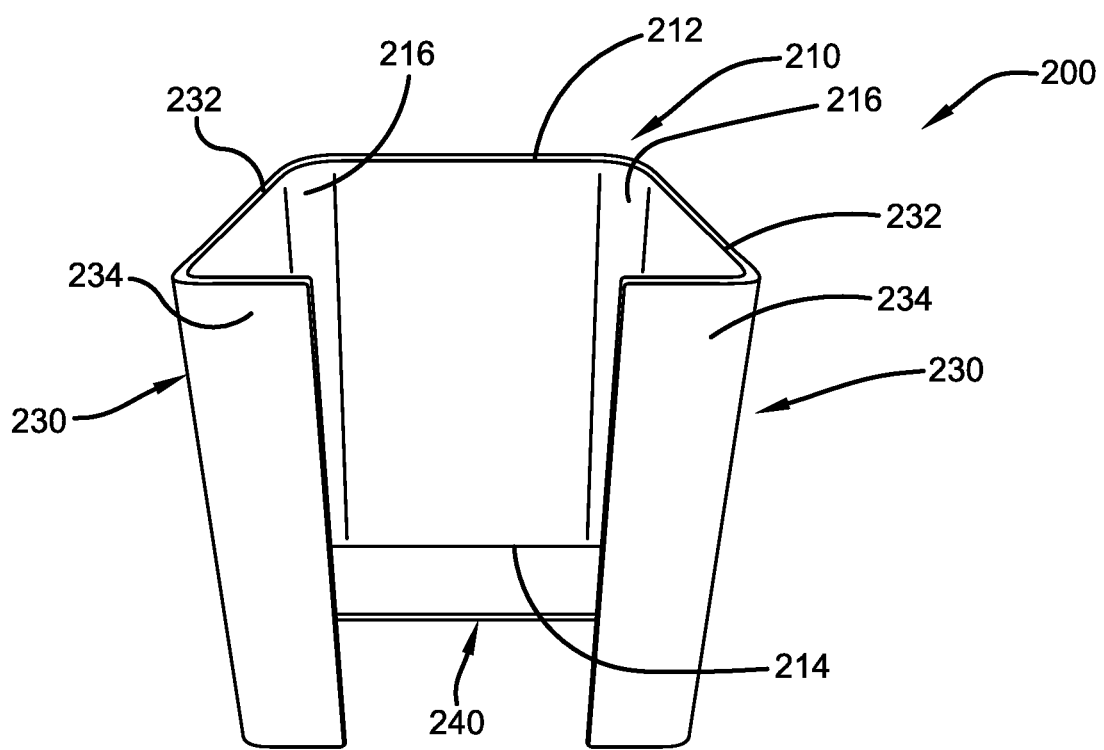
FIG. 4 illustrates a perspective view of one potential embodiment of a cable cradle device of the present invention for retaining a power connector in accordance with the disclosed architecture.
Figure 5:
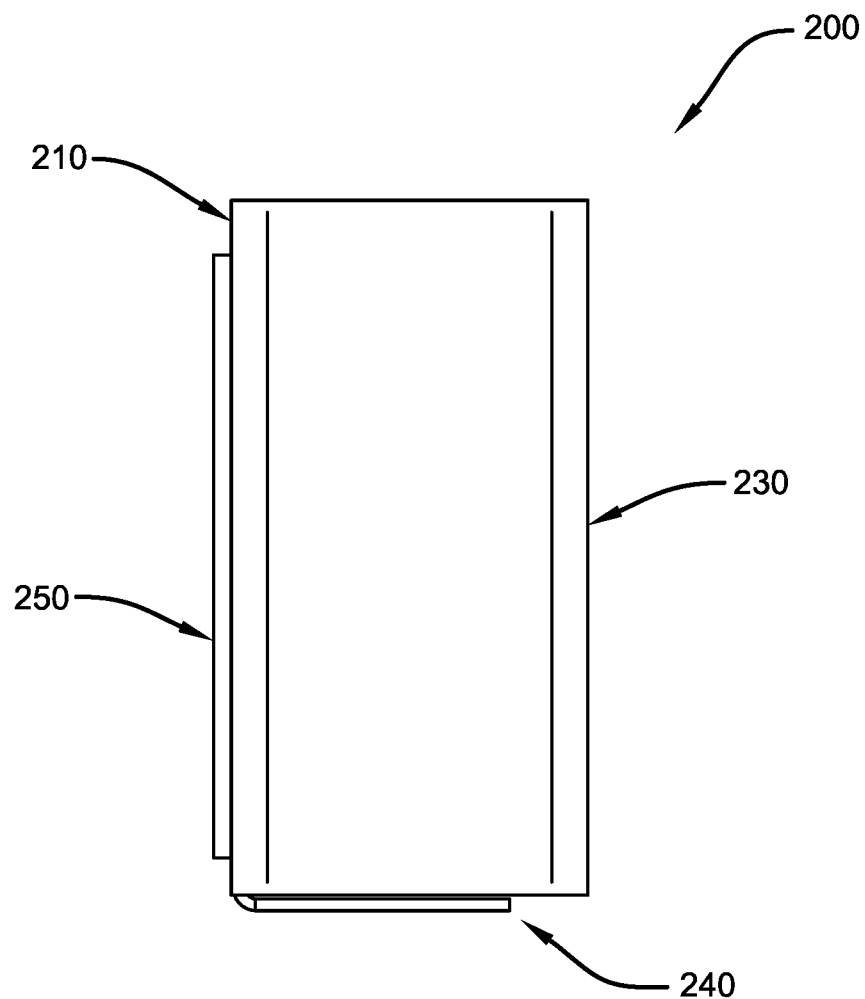
FIG. 5 illustrates a side view of the cable cradle device of the present invention in accordance with the disclosed architecture.

In an additional embodiment as illustrated in FIGS. 4 and 5, a cable cradle device 200 for retaining a cable connector, such as industrial power connectors is disclosed. The cable cradle device 200 is generally rectangular in shape and open at the top to accept a cable connector. The cable cradle device 200 comprises a rectangular base wall 210 which is a planar surface. The base wall 210 comprises a top edge 212, a bottom edge 214, and a pair of side edges 216.

The cable cradle device 200 further comprises a pair of opposing side brackets 230. Each opposing side brackets 230 comprises a bracket side wall 232 that extends generally perpendicularly upward from the respective longitudinal side edges 216 of the base wall 210. Each opposing side brackets 230 further comprises a bracket rim wall 234. Each bracket rim wall 234 extends inwardly from a top of the respective bracket side wall 232 toward the opposing side bracket 1230. Each bracket rim wall 134 is substantially parallel to the base wall 210. As such, each side bracket 230 is L-shaped and form a U-shaped housing with the base wall 210 where the industrial power connector can be inserted from the top of the cable cradle device 200.

The cable cradle device 200 further comprises a bottom bracket 240. The bottom bracket 240 is a flat lip that extends perpendicularly outward from the bottom edge 214 of the base wall 210. The bottom wall 206 may be flat or comprise a pair of cut-outs 242 of generally semi-circular shape that are symmetric to the radial midpoint of the bottom edge 214.

As illustrated in FIG. 5, the cable cradle device 200 further comprises amounting attachment 250. The mounting attachment 250 is attached to a back of the base wall 210. The mounting attachment 250 is used to secure the cable cradle device 200 to a wall, pole or a ceiling. The mounting attachment 250 may be an adhesive, a hook and loop fastening system, a mechanical fastener, or the like.

Figure 6:
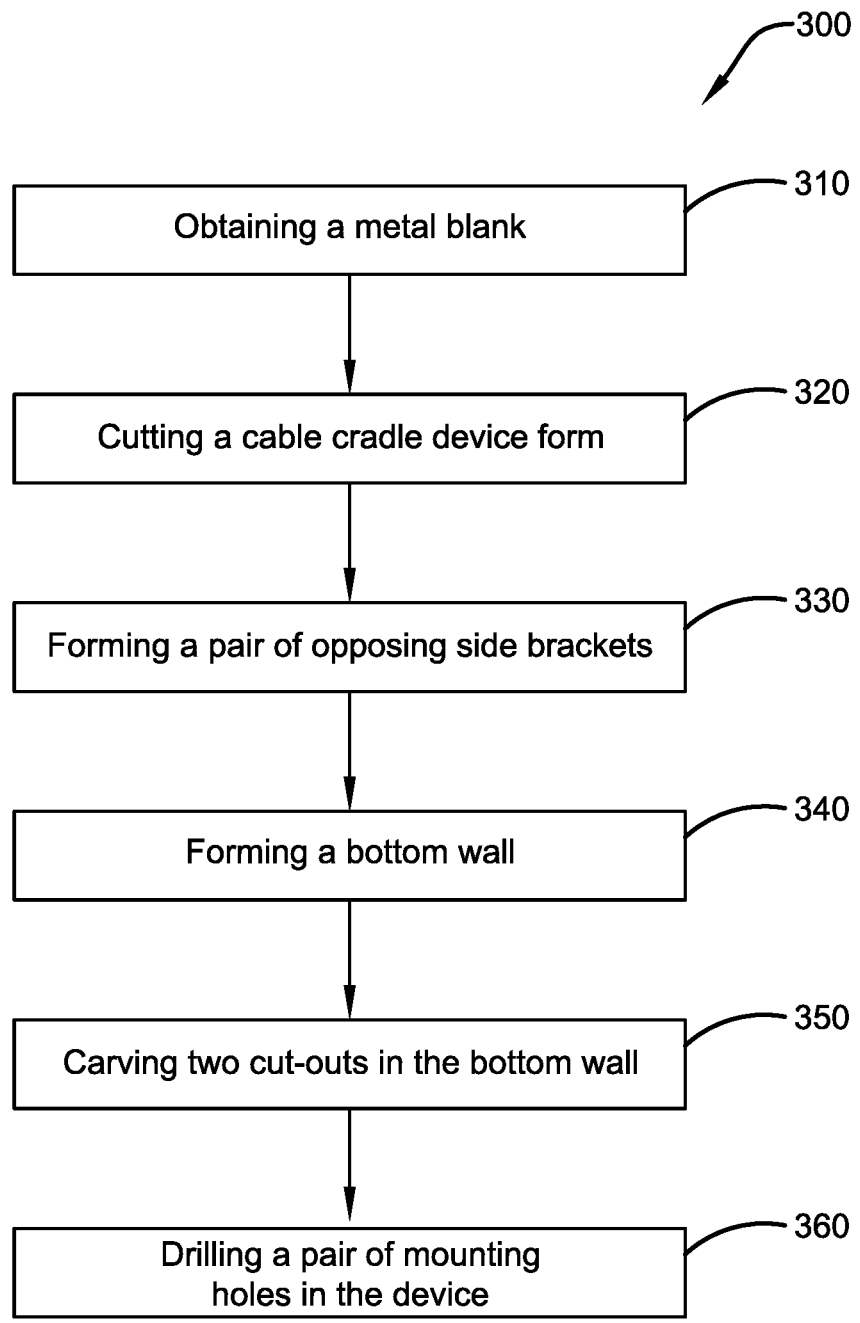
FIG. 6 illustrates a flow diagram illustrating steps of a manufacturing process of the cable cradle device of the present invention in accordance with the disclosed architecture.

In an additional embodiment as illustrated in FIG. 6, a method 300 of manufacturing a cable cradle device 100 is disclosed. The method begins at 310 by obtaining a metal blank for use in forming the cable cradle device 100. At 320, a cable cradle device 100 form is cut from the blank. The method continues at 330 by forming a pair of opposing side brackets 130 using a metal bending process. The pair of side brackets 130 each comprises a bracket side wall 132 that extends generally perpendicularly upward from the respective longitudinal side edges 116 of a base wall 110. Each opposing side brackets 130 further comprises a bracket rim wall 134. Each bracket rim wall 134 extends inwardly from a top of the respective bracket side wall 132 toward the opposing side bracket 130. Each bracket rim wall 134 is substantially parallel to the base wall 110. To form the L-shape of the brackets 130, a desired force is applied to the metal blank used for making the cable cradle device 100, causing the metal blank to bend at an angle and form the desired L-shape.

The method 300 continues at 340 by forming a bottom bracket 140 using the metal bending process. The bottom bracket 140 is a flat lip that is bent to extend perpendicularly outward from a bottom edge 114 of the base wall 110. The bottom bracket 140 is shorter than either of bracket side walls 132. At 350, a pair of semi-circular cut-outs 142 are cut or carved into the bottom bracket sized to accept a cable. Finally, at 360 a pair of mounting holes 118 and 120 are drilled into the base wall 110. The pair of mounting holes 118 and 120 may be counter sunk and are used to mount the cable cradle device 100 to a wall.

A connector may be securely placed in the cable cradle device 100 and held in place by the pair of opposing side brackets 130 and the bottom bracket 140. The connector rests on the bottom bracket 140 and is inserted or removed from the open top of the cable cradle device 100. The cable cradle device 100 is generally made up of a metal or heavy plastic to protect the connector. The cable cradle device 100 is attached to a safe location such as a wall or pole above ground, thus, preventing cables and plugs to be on the ground and from being damaged. The cable cradle device 100 of the present invention is lightweight, comes in various colors and sizes, may have any trademark, logo or any other design and provides cost-effective reliability, design flexibility and safety for connectors during installation and use.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "holder and protector for industrial power connectors", "holder and protector", "connector holder", and "holder" are interchangeable and refer to the holder and protector for the cable cradle devices 100 and 200 of the present invention.

Notwithstanding the forgoing, the cable cradle devices 100 and 200 of the present invention can be of any suitable size and configuration as is known in the art without affecting the overall concept of the invention, provided that it accomplishes the above stated objectives. One of ordinary skill in the art will appreciate that the size, configuration and material of the cable cradle devices 100 and 200 as shown in the FIGS. are for illustrative purposes only, and that many other sizes and shapes of the cable cradle devices 100 and 200 are well within the scope of the present disclosure. Although the dimensions of the holder and protector for the cable cradle devices 100 and 200 are important design parameters for user convenience, the cable cradle devices 100 and 200 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cable cradle device for retaining a cable connector comprising:
    a base wall comprising a pair of mounting holes penetrating the base wall;
    a pair of opposing side brackets, each comprising a bracket side wall extending perpendicularly outward from a side edge of the base wall, and a bracket rim wall extending inwardly from a top of the bracket side wall toward the opposing side bracket; and
    a bottom bracket extending perpendicularly outward from a bottom edge of the base wall, wherein the bottom bracket is a flat lip comprising a pair of semi-circular cutouts that are symmetrical to a radial midpoint of the bottom edge.

2. The cable cradle device of claim 1, wherein the pair of mounting holes are countersunk into the base wall.

3. The cable cradle device of claim 1, wherein the pair of mounting holes are arranged vertically in the base wall.

4. The cable cradle device of claim 1, wherein the base wall is rectangular in shape.

5. The cable cradle device of claim 1, wherein the cable cradle device is manufactured by injection molding.

6. The cable cradle device of claim 1, wherein the cable cradle device is manufactured from a bendable sheet metal.

7. A cable cradle device for retaining a cable connector comprising:
    a base wall comprising a pair of mounting holes penetrating the base wall;
    a pair of opposing side brackets, each comprising a bracket side wall extending perpendicularly outward from a side edge of the base wall, and a bracket rim wall extending inwardly from a top of the bracket side wall toward the opposing side bracket; and
    a bottom bracket extending perpendicularly outward from a bottom edge of the base wall, wherein the bottom bracket is a flat lip comprising a pair of semi-circular cutouts that are symmetrical to a radial midpoint of the bottom edge; and
    a mounting component attached to a back of the base wall.

8. The cable cradle device of claim 7, wherein the mounting component is an adhesive.

9. The cable cradle device of claim 7, wherein the mounting component is a hook and loop fastener.

10. The cable cradle device of claim 7, wherein the mounting component is a mechanical fastener.

* * * * *